Patented Feb. 6, 1923.

1,444,277

UNITED STATES PATENT OFFICE.

MAXIMILIAN P. SCHMIDT AND HEINRICH ROESE, OF BIEBRICH-ON-THE-RHINE, GERMANY, ASSIGNORS TO THE FIRM KALLE & COMPANY, AKTIENGESELLSCHAFT, OF BIEBRICH-ON-THE-RHINE, GERMANY.

MANUFACTURE OF DYESTUFFS.

No Drawing.  Application filed February 20, 1922.  Serial No. 538,145.

*To all whom it may concern:*

Be it known that we, MAXIMILIAN P. SCHMIDT and HEINRICH ROESE, citizens of the German Republic, and residents of Biebrich-on-the-Rhine, Germany, have invented certain new and useful Improvements in the Manufacture of Dyestuffs (for which we have made application in Germany December 2, 1918), of which the following is a specification.

We have found that naphthalene-dithioglycolic acids or their derivatives are enabled to form two nuclei of oxythiophen which are combined with the nucleus of the naphthalene. We have further found that by oxidizing the obtained dioxythiophennaphthalenes or by combining them with compounds containing a reactive CO, CS or similar group in the usual manner, thioindigo or indigoid coloring matters of different valuable tints and fastness are obtained. The process may be carried out for instance as follows:

(1) 32.5 parts by weight of naphthalene-2.6-disulfochlorid are reduced in the heat in a mixture of 100 parts by volume of alcohol and 25 parts by volume of water with 60 parts of weight of zinc dust to the corresponding naphthalene-disulfinic-acid. By further acid reduction with hydrochloric acid an insoluble product of the character of a disulfide is obtained. This product is reduced to the naphthalene-2-6-dimercaptan by means of alkaline hydrosulfite and is condensed at once in the same solution with an alkaline solution of 20 parts by weight of chloroacetic acid. The mass is filtered, if necessary, and the naphthalene-2-6-dithioglycolic-acid precipitated by the addition of hydrochloric acid until congo-acid reaction takes place. The product is washed and dried. It is only difficultly soluble in organic solvents, except nitrobenzene. In alkali or soda it dissolves by forming salts. The sodium-salt is insoluble in alcohol, the calcium salt is very difficultly soluble in water. From glacial acetic acid the new body crystallizes in microscopic tablets of the melting point 212° centigrade.

To transform the naphthalene-2-6-dithioglycolic-acid in the corresponding oxythionaphten and the thioindigo coloring matter the dithioglycolic acid is introduced in about the 10 fold quantity by weight of chlorosulfonic acid under cooling with ice. It dissolves with a yellowish-brown color. After some time the naphthalene-2.1-5.6 bisoxythiophen of the following constitution is formed.

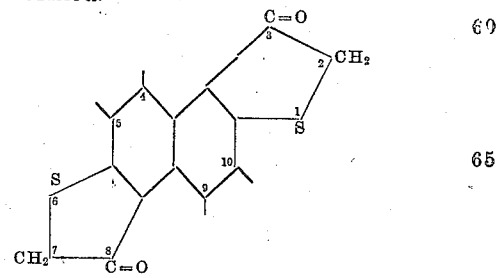

If the solution of this body stands some hours at usual temperature the color is transformed to a dirty brown and the corresponding thioindigo coloring matter is obtained directly.

Hitherto it could not be ascertained, how many molecules of the bisoxythiophen join for the formation of the thioindigo.

The coloring matter gives a violet-red vat from which cotton is dyed green tints fast to chlorin and washing. It is insoluble in the usual organic solvents. In concentrated sulfuric acid a change of the color to brown-violet takes place, but no solution.

According to the process of the example above described also other napthalenethioglycolic acids and derivatives may be produced. The naphthalene-1.5 dithioglycolic-acid is still more difficultly soluble than the 2.6-acid. Its melting point is about 250° centigrade. By treating it with chlorosulfonic acid the thioindigo coloring matter may be obtained, dyeing cotton from the violet vat muddy blue violet and dissolving in concentrated sulfuric acid with a brown-violet color.

The 1-chloro-naphthalene-3-8-dithioglycolic acid, dissolves easily in alcohol or glacial acetic acid, difficultly in hydrocarbons. It may be crystallized from diluted alcohol or glacial acetic acid. Its melting point is about 197° centigrade. With chlorosulfonic acid a muddy brown-violet coloring matter is obtained.

With bodies containing a reactive CO, CS or another group of this kind and being able to condense with oxythionaphtenes also the present bisoxythiophenes may be condensed as aforesaid.

For instance by condensing 1 mol. of the bisoxythiophene obtained from naphthalene-2-6-dithioglycolic acid with 1 mol. of chloroisatin a brown-black vat-dye-stuff results giving on saponifying a brown-olive, whereas with 1 mol. of an isatin-a-derivative an olive, and with 2 mol. of keto-dihydrothionaphtene-2-anil in glacial acetic a brown-violet vat dye-stuff is obtained.

By condensing 1 mol. naphthalene bisoxythiophene obtained from 1-choloro-naphthalene-3-8-dithioglycolic acid with 1 or 2 mol. of chloroisatin brown vat dye-stuffs are produced.

With bromoisatin similar coloring matters are obtained.

We have also found that for the condensation it is not necessary to employ the ready formed oxythiophene-naphthalenes, but that also the corresponding naphthalene-bis-thioglycolic acids may be used directly, under the condition that the condensation is performed in chlorosulfonic acid. Besides the fact that the very reactive intermediate products need not be isolated and that one operation is spared, also the formation of the troublesome thioindigo-dye-stuff is prevented.

The process is carried out as follows: The parts are by weight.

(2) 308 parts of naphthalene 2-6 dithioglycolic acid are intimately mixed with 182 parts chloroisatin and the mixture is slowly introduced into 3000 parts of chlorosulfonic acid while cooling. The mass dissolves. After some time it is poured on ice, whereupon the precipitated dye-stuff is filtered and washed until free of acid. The dye-stuff is identical with the above mentioned obtainable from 1 mol. of the corresponding naphthalene-bis-oxythiophen with 1 mol. chloroisatin.

(3) The mixture of 342.5 parts of 1 chloro-3.8.dithioglycolic-acid and 305 parts of dibromo-isatin is stirred into 3400 parts of chlorosulfonic acid while cooling. After several hours the mass is treated as described in the foregoing example.

The obtained dye-stuff is a black-brown, giving a brownish-yellow vat, from which cotton is dyed brown shades. The dye-stuff dissolves in concentrated sulfuric acid with a dirty red-violet, in chlorosulfonic acid with a blue-violet color.

We claim—

1. The new vat coloring matters, derived from a naphthalene-bis-thioglycolic acid containing at least two of the groups,

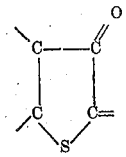

which in powdered form are brown or black, and which are soluble in sulfuric acid with a brown-black color, producing with an alkali hydrosulfite vats from which the fiber is dyed from brown to black.

2. As new products the indigoid dye-stuffs obtainable by condensing naphthalene-bis-oxythiophenes with bodies reacting with oxythionaphtenes, being brown to black powders, insoluble in the usual solvents, forming with alkali hydrosulfite a yellow-brown to violet vat, from which the fibre is dyed green to brown to violet to black shades, substantially as described.

3. As a new product the indigoid vat dye-stuffs obtainable by condensing 1 mol. of the naphthalene-bis-oxythiophen from the naphthelene-2-6-dithioglycolic acid with 1 mol. of a halogenisatin, the coloring matter being a black-brown powder, insoluble in the usual organic solvents, soluble in concentrated sulfuric acid with a dirty violet color, with alkaline hydrosulfite giving a brown vat, from which the cotton fibre is dyed brown shades, giving on soaping a brown-olive.

In testimony whereof we affix our signatures in presence of two witnesses.

Dr. MAXIMILIAN P. SCHMIDT.
Dr. HEINRICH ROESE.

Witnesses:
Dr. August Roth,
Basil E. Savary.